United States Patent [19]

Salour et al.

[11] Patent Number: 4,703,175
[45] Date of Patent: Oct. 27, 1987

[54] FIBER-OPTIC SENSOR WITH TWO DIFFERENT WAVELENGTHS OF LIGHT TRAVELING TOGETHER THROUGH THE SENSOR HEAD

[75] Inventors: Michael M. Salour, Carlsbad, Calif.; Gerhard Schoner, Graz, Austria; James H. Bechtel, San Diego, Calif.; Martin Kull, Stockholm, Sweden

[73] Assignee: Tacan Corporation, Carlsbad, Calif.

[21] Appl. No.: 767,037

[22] Filed: Aug. 19, 1985

[51] Int. Cl.$^4$ .......................... H01J 5/16; H01J 40/14
[52] U.S. Cl. ................................ 250/227; 250/231 R; 374/161
[58] Field of Search .......................... 250/227, 231 R; 374/161, 162

[56] References Cited

U.S. PATENT DOCUMENTS

| | | | |
|---|---|---|---|
| 4,342,919 | 8/1982 | Bogardh | 250/577 |
| 4,356,396 | 10/1982 | Ruell et al. | 77250/227 |
| 4,369,364 | 1/1983 | Kuntermann | 250/227 |
| 4,378,496 | 3/1983 | Bogardh et al. | 250/227 |
| 4,410,020 | 10/1983 | Lorenz | 141/65 |
| 4,433,238 | 2/1984 | Adolfsson et al. | 250/227 |
| 4,468,567 | 8/1984 | Sasano et al. | 250/577 |
| 4,498,004 | 2/1985 | Adolfsson et al. | 250/227 |
| 4,514,860 | 4/1985 | Adolfsson et al. | 455/612 |
| 4,523,092 | 6/1985 | Nelson | 250/231 R |
| 4,529,875 | 7/1985 | Bogardh et al. | 250/227 |
| 4,531,250 | 7/1985 | Bogardh | 382/13 |
| 4,554,449 | 11/1985 | Taniuchi et al. | 250/227 |
| 4,594,504 | 6/1986 | Coursolle et al. | 250/227 |
| 4,599,711 | 7/1986 | Cuomo | 367/141 |
| 4,607,160 | 8/1986 | Sakakino | 250/227 |

Primary Examiner—David C. Nelms
Assistant Examiner—William L. Oen
Attorney, Agent, or Firm—Stanley A. Becker

[57] ABSTRACT

A fiber-optic system for measuring a desired environmental parameter, such as temperature, is disclosed. The system includes a fiber-optic sensing head that alters light of a prescribed frequency as a function of the environmental parameter to be measured. Light not of the prescribed frequency is not so altered. In a preferred embodiment of the fiber-optic sensing head, a semiconductor material is positioned between two substantially parallel optical fibers at a distal end of the fibers. One fiber serves as in input channel and the other fiber serves as an output channel. Both fibers approach the semiconductor material from the same direction. Light channeled to the semiconductor material is reflected at the distal end of the input fiber so as to pass through the semiconductor material, and then is reflected again at the distal end of the output fiber so as to pass back out the output fiber. The semiconductor material absorbs the light of the prescribed frequency as a function of temperature. By monitoring the intensity of the light of the first frequency at the output channel, a measurement of the temperature to which the fiber-optic sensing head is subjected can be determined. To remove the influence of input light intensities, fiber attenuation, and the like, from the temperature measurement, lights of two frequencies, only one of which is the prescribed frequency, are selectively directed to an optical detector through the fiber-optic sensing head and through a separate fiber-optic reference channel. The four measurements thus obtained at the optical detector—prescribed frequency through sensing head, prescribed frequency through reference channel, non-prescribed frequency through sensing head, and non-prescribed frequency through reference channel—are appropriately processed in order to generate a signal that has all variations or influences removed therefrom except the temperature variations of the sensing head.

38 Claims, 13 Drawing Figures

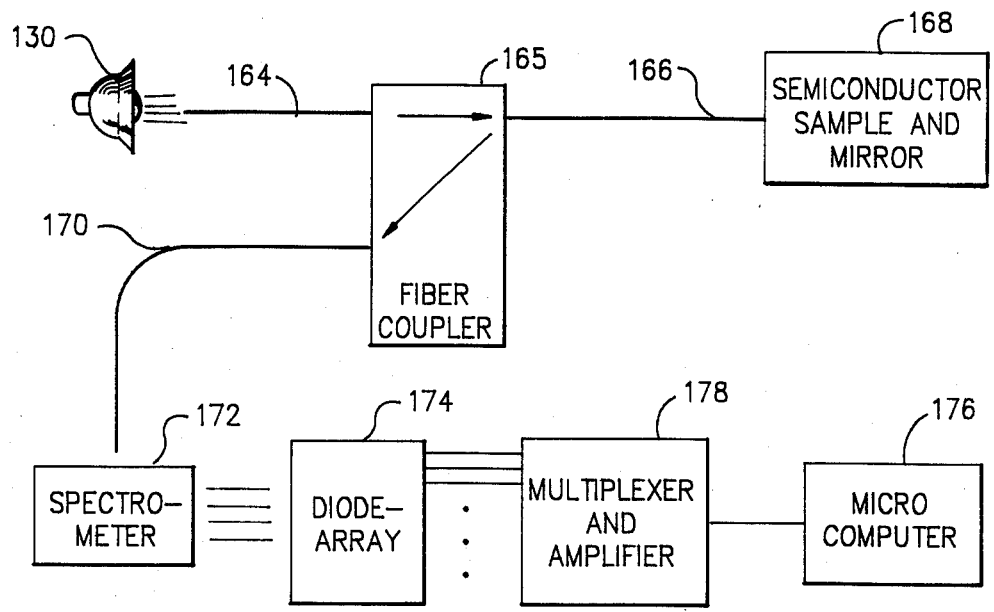
FIG. 10
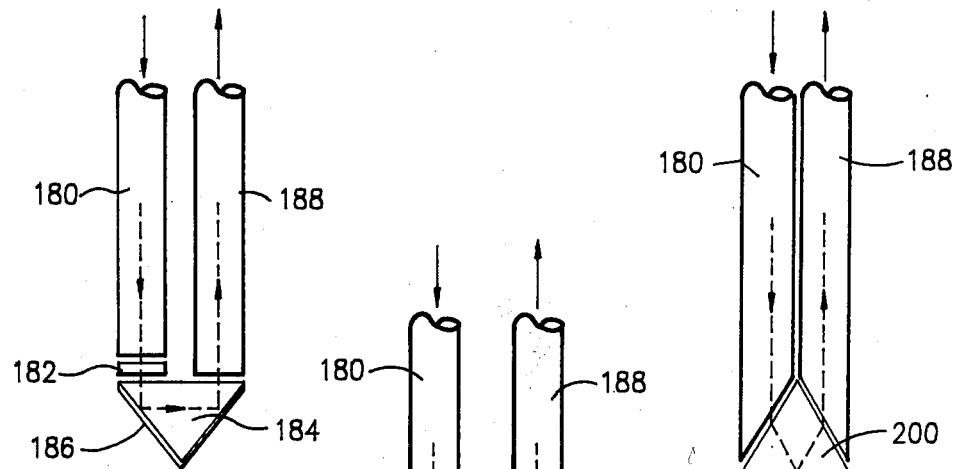
FIG. 11
FIG. 12
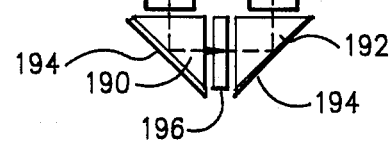
FIG. 13

FIBER-OPTIC SENSOR WITH TWO DIFFERENT WAVELENGTHS OF LIGHT TRAVELING TOGETHER THROUGH THE SENSOR HEAD

BACKGROUND OF THE INVENTION

The present invention relates to transmission fiber-optic sensors, and more particularly to transmission fiber-optic temperature sensors utilizing two parallel fibers that approach a temperature sensitive material from the same direction.

Several types of fiber-optic transmission sensors for temperature measurement are known in the art. For these sensors the fibers are used to guide light to a temperature sensitive material and back to a detector. Examples of such prior art sensors are found in U.S. Pat. Nos. 4,376,890; 4,462,699; 4,223,226; 4,313,344 and British Patent No. UK 2025608. Another type of fiber-optic temperature sensor is disclosed in Kyuma et. at., IEEE Journal of Quantum Electronics, Vol. QE-18, No. 4, April 1982, pages 676-679. Kyuma discloses a fiber-optic instrument for temperature measurement that uses two light emitting diodes (LED's) as light sources. Each LED has a different wave length. Optical pulses from each of these LED's are guided through a fiber-optic channel that includes the fiber-optic sensor made from a semiconductor material. One LED is selected to emit light with a photon energy near the band gap energy of the semiconductor sample. The absorption of this light in the semiconductor sample is a function of the temperature. The second LED emits light with a photon energy less than the band gap of the semiconductor material, and is therefor not absorbed in the semiconductor sample. This second light source is used as a reference so that attenuation changes in the fiber can be eliminated from the temperature measurement.

Despite the fact that the above-described prior art fiber-optic temperature sensors generally use some sort of a reference signal in order to minimize or eliminate effects of fiber-optic attenuation, the resulting temperature measurements are nonetheless subject to variations in the light intensity originating at the source of light. Moreover, where the temperature sensitive element absorbe light falling withina prescribed frequency range, variations in the frequency of the input light source can also adversely affect the temperature measurement. Further, where two light sources are used, as is the case in Kyuma et. al., a change of the intensity ratio of the light generated by the two LED's can influence the temperature measuremen. A change of the intensity ratio can occur, for example, out of different aging properties associated with the LED's. Further, the temperature range that can be measured may be limited due to the particular frequency spectrum of the LED or other light source that is used.

A common problem associated with fiber-optic sensor applications is to measure the temperature in a very narrow cavity. This necessitates that the input and output fibers be parallel to each other at the entrance of the cavity. However, the operation volume at which the actual temperature sensitive material is located must be determined by the radius of the fiber loop because, as taught in the prior art, the input and output fibers must share a common axis. This operation volume is much larger than the volume of the fiber or of the temperature sensitive material. Hence, the fiber-optic sensors of the prior art are limited for use in an operation volume that is not less than the radius of a fiber loop.

SUMMARY OF THE INVENTION

It is an object of the present invention to provide a fiber-optic sensor that overcomes the above-mentioned problems associated with prior art fiber-optic sensors.

More particularly, it is an object of the present invention to provide a fiber-optic sensor or coupler that can be utilized in a very narrow operation volume.

It is a further object of the present invention to provide a fiber-optic sensor or coupler wherein both the input and output fibers are substantially parallel to each other and approach the sensitive material from the same direction, thereby allowing the sensitive material to be placed at a distal tip of a fiber-optic bundle that includes the input and output fibers.

Another object of the present invention is to provide a system wherein a fiber-optic sensor can be employed to accurately measure a desired parameter, such as temperature, without being affected by input light source intensities, fiber attenuation, and fiber coupling factors.

Yet another object of the invention is to provide a method of using a transmission fiber-optic sensor in order to accurately measure a desired environmental parameter, such as temperature.

Still an additional object of the present invention is to provide a fiber-optic sensor and method of use that is relatively inexpensive and easy to make, yet provides repeatable, accurate measurements over the life of the components used therein.

The above and other objects of the invention are realized using a fiber-optic sensor configuration that includes two parallel fibers. At a distal tip of these fibers, appropriate reflection means are employed to reflect the light from one fiber axis to the other, thereby causing light to be coupled from one fiber to the other. The sensitive material is sandwiched between the fibers at the distal tip and positioned so that the light passes therethrough as it is coupled from one fiber to the other. The light propagation direction in the output fiber is opposite to that of the input fiber. The sensitive material is located at the distal tip of this configuration so that the sensor itself has a small operation volume and can be easily inserted into very narrow cavities.

In the preferred embodiment, the sensitive material is gallium arsenide (GaAs). This GaAs sample is a temperature sensitive material having a band gap energy that changes with temperature. That is, when light having a frequency near the band gap energy of the semiconductor material is coupled thereto, the amount of light absorbed by the semiconductor sample is a function of temperature. A second light source having a wavelength not absorbed across the band gap of the semiconductor sample is also used as a reference in order to eliminate variations in the fiber attenuation. However, a reference fiber channel is also used in addition to the sensing fiber channel in which the GaAs sample is located. At the end of both channels, appropriate detectors transform the light signals to electrical signals that are amplified and processed. In the preferred embodiment, this processing further includes digitizing the signals and controlling the LED light sources so that only one LED emits light at a given time. At the detectors at the end of both the reference and sensing channels, two intensity values may thus be obtained, one for each LED light source. Appropriate ratios can then be determined in order to derive a signal that is solely a function of temperature and independent of the other parameters associated with the fiber-optic channels, couplers, and other elements employed. Cadmium telluride (CdTe) and cadmium sulfide (CdS) are other sensitive materials which may be used.

Further embodiments of the invention contemplate the use of a broad-band light source, such as a halogen lamp, in order to enlarge the range of temperature measurements that can be made. Conventional prisms or gratings are employed in order to separate different wavelengths in space. These separate wavelengths can then be directed through appropriate fiber-optic channels to the fiber-optic temperature sensors and back to appropriate detectors.

BRIEF DESCRIPTION OF THE DRAWINGS

The above and other objects, features, and advantages of the present invention will be more apparent from the following more particular description thereof, presented in conjunction with the following drawings, wherein:

FIGS. 8–10 show alternative fiber-optic measurement systems for use with a broad spectrum light source; and FIGS. 11–13 show Variations of the preferred fiber-optic sensing head of FIG. 4.

DETAILED DESCRIPTION OF THE INVENTION

The following description is of the best presently contemplated mode of carrying out the invention. This description is not to be taken in a limiting sense but is made merely for the purpose of describing the general principles of the invention. The scope of the invention should be determined with reference to the appended claims.

Figure 1:
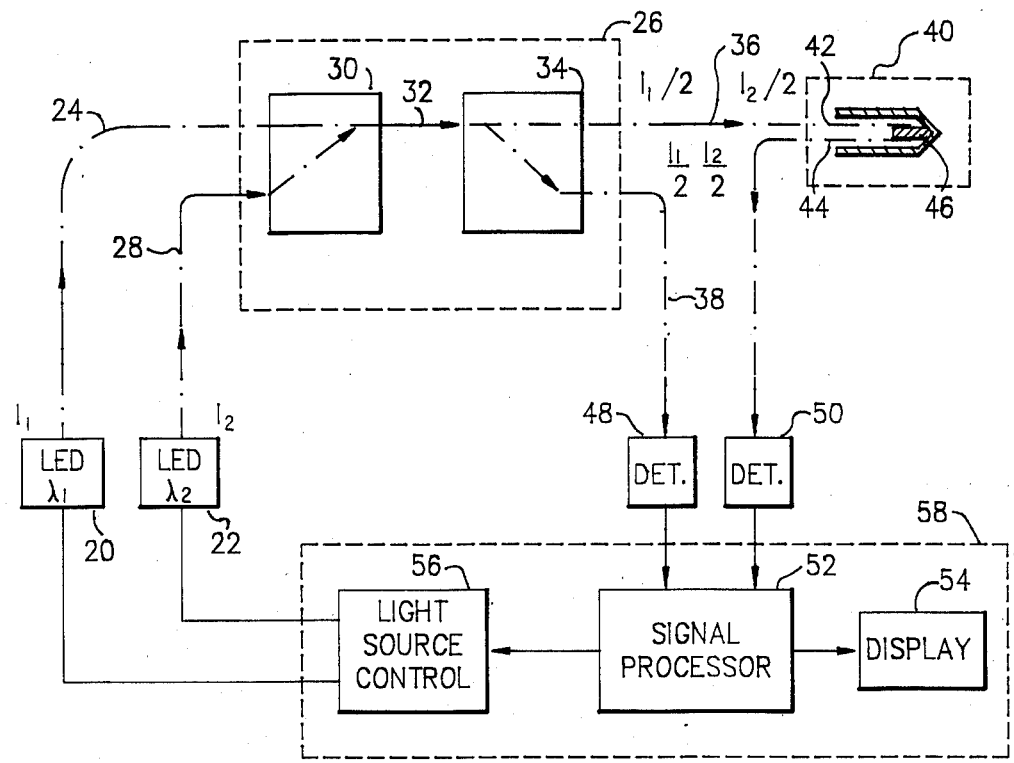
FIG. 1 is a block diagram of the fiber-optic sensing system of the present invention.

Referring to FIG. 1 there is shown a block diagram of the fiber-optic sensing-system of the present invention. In this figure, electrical paths are shown by a solid line, and optical paths are shown by a dash-dotted line. A first LED 20 generates a light having a frequency $\lambda_1$. A second LED 22 generates a light of frequency $\lambda_2$. Light from LED 20 is transmitted through fiber-optic channel 24 to fiber-optic coupler 26. Similarly, light from LED 22 travels through fiber-optic channel 28 to the fiber-optic coupler 26. The fiber-optic coupler 26 comprises two fiber couplers in series. A first coupler 30 couples the light from channel 28 with the light of channel 24 into a single channel 32. A second coupler 34 directs the light from channel 32 into channel 36 and channel 38.

The fiber-optic channel 36 channels the light to a fiber-optic sensing head 40. Light enters the sensing head 40 by way of an input channel 42 and exits the sensing head 40 by way of an output channel 44. At a distal tip of the channels 42 and 44 the light is coupled from channel 42 through a sensitive material 46 to the channel 44. The sensitive material 46 is selected because of its optical properties to absorb the wavelength $\lambda_1$ as a function of temperature, but not to absorb the wavelength $\lambda_2$.

A detector 48 detects light traveling through the reference channel 38. A similar detector 50 detects the light traveling through the sensing channel 44 after the light has passed through the sensing head 40. The detectors 48 and 50 convert the detected light to electrical signals which are processed by a signal processor 52. As a result of the processing performed by the signal processor 52, a signal is derived representative of the environmental parameter being measured, which signal is displayed in a suitable display device 54. In the preferred embodiment of the invention, a light source control 56 is utilized to selectively turn on the LED 20 and LED 22. Preferably, these light sources 20 and 22 are pulsed at different times so that only one frequency, $\lambda_1$ or $\lambda_2$, is present in the various fiber-optic channels at any given time. The signal processor 52, and light source control 56, may be realized with a microcomputer 58, which microcomputer 58 may also include a suitable display device 54.

While the preferred embodiment of the invention disclosed herein relates to a fiber-optic temperature sensor and system for measuring temperature, it is to be understood that the invention is not so limited. For example, the sensing head 40 could utilize any sensitive material that responds to a desired environmental parameter so as to vary the optical properties thereof. For example, such a sensing head 40 could be used to measure pressure, humidity, or other environmental parameters.

The configuration of FIG. 1 offers several advantages. The microprocessor 58, or equivalent signal processor 52 and light source control 56, can control the turning on of the LED light sources 20 and 22. Four separate measurements can be made at the detectors 48 and 50. These measurements include: (1) the light intensity $\lambda_1$ as measured at detector 48; (2) the light intensity $\lambda_2$ as measured at the detector 48; (3) the light intensity $\lambda_1$ as measured at the detector 50; and (4) the light intensity $\lambda_2$ as measured at the detector 50. From these four measurements the temperature can be calculated from the ratio of the four intensities thus measured. The reference wavelength $\lambda_1$ eliminates effects on the temperature measurement due to changes of absorption of the fiber channels 24, 28, 32, 36, and 38, and due to changes of the coupling ratio of the fiber coupler 26. The use of the reference channel 38 eliminates perturbations due to intensity changes of the LEDs 20 and 22 or changes of the LED-to-fiber coupling factors.

As indicated previously, the sensitive material 46 utilized in the preferred embodiment of the sensing head 40 is the semiconductor GaAs. The light source $\lambda_1$ is selected such that the GaAs semiconductor band gap energy is within this band width for the entire temperature range of interest. Advantageously, GaAs is a simple bulk semiconductor material with a strong temperature dependence of the band gap and a convenient band gap energy for use with fiber-optics. GaAs is inexpensive, readily available, and requires far less processing than other known materials, such as heterostructures.

The typical change in the band gap energy with temperature in GaAs corresponds to a shift of the absorption spectrum of approximately 0.3 nm/°C.

Figure 2:
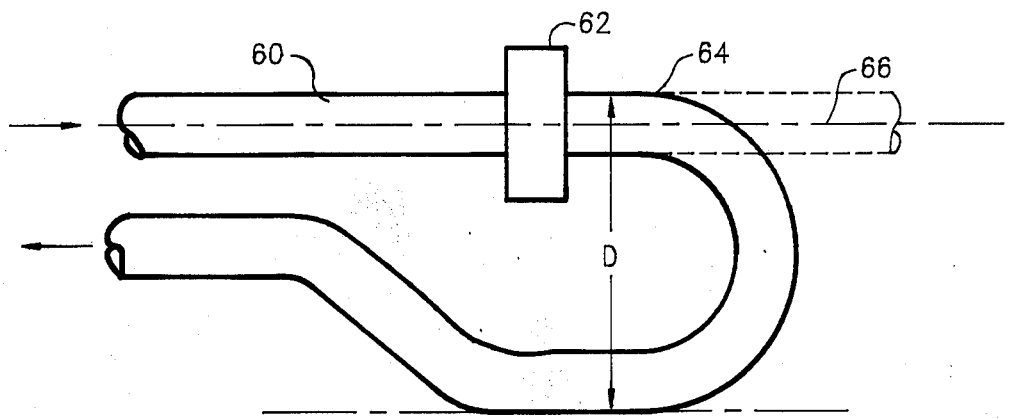
FIG. 2 shows a single-axis fiber-optic head for sensing temperature according to the teachings of the prior art.

Referring next to FIG. 2, a common axis fiber coupler of the prior art is illustrated. In this configuration, an input channel fiber 60 is attached to a sensitive material 62. An output fiber channel 64 is connected to a different side of the sensitive material 62 so as to share a common axis 66 with the input channel 60. If it is necessary, as is usually the case, for the output channel 64 to be directed to the same location from whence the input channel 60 originates, then the output channel 64 must be bent and looped back around so as to be parallel with the input channel 60. This means that the operation volume wherein the sensor could be utilized would have to have a diameter of at least the distance D. Disadvantageously, this limitation severely restricts the locations where the sensor could be readily used.

Figure 3:
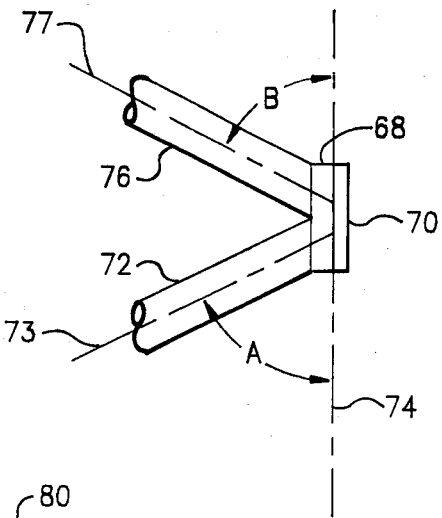
FIG. 3 shows one embodiment of a fiber-optic sensing head in accordance with the teachings of the present invention.
Figure 4:
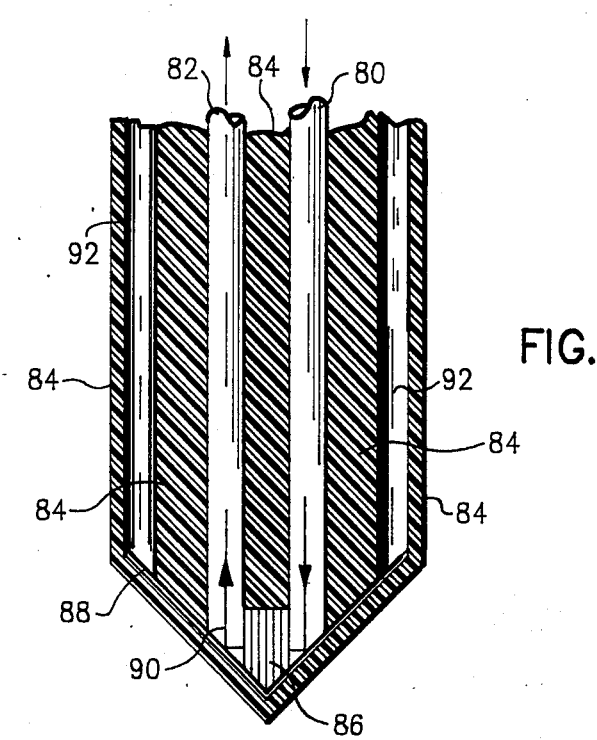
FIG. 4 shows a preferred embodiment of the fiber-optic sensing head of the present invention.
Figure 6:
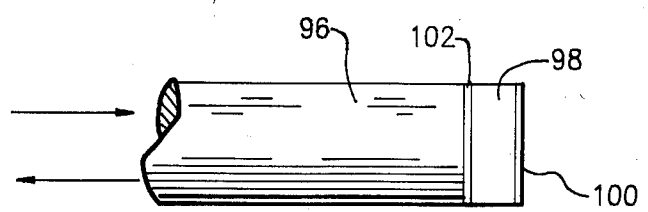
FIG. 6 shows an alternative embodiment of the fiber-optic sensing head utilizing a single optical fiber.

In accordance with the present invention a sensing head 40 is utilized wherein both the input and output fiber channels approach the sensitive material from the same direction, as shown in FIGS. 3, 4, and 6. In FIG. 3, the sensitive material 68 is preferably a semiconductor platelet. A mirror 70 is affixed to the back side of the platelet 68. The input fiber channel 72 approaches the platelet 68 such that the fiber axis 73 forms an angle A with the plane 74 of the mirror 70. An output fiber channel 76 is similarly attached to the semiconductor platelet 68 so that the fiber axis 77 forms an angle B with the plane 74. In order to insure that the vast majority of light traveling through the input channel 72 reflects off of the mirror 70 into the output channel 76, the angle A is selected to be substantially equal to the angle B. Such angles, for purposes of the terminology used herein, are referred to as matching or mutual angles.

Referring next to FIG. 4, the preferred embodiment of the fiber-optic sensing head 40 is illustrated. In accordance with this embodiment, an input fiber channel 80 lies substantially parallel with an output fiber channel 82. The desired parallelism is maintained through the use of epoxy 84. A GaAs platelet 86 is sandwiched between the input-channel 80 and the output channel 82 at the distal tip of these fibers. The end faces at this distal tip of these fibers are polished at 45 degrees to the fiber axis. A silver coating 88 is placed over the end faces of the fibers so as to reflect light traveling through the input channel 80 through the GaAs platelet 85 to the output channel 82, as indicated by the arrow 90. Capillary sleeve 92 is used to secure the fibers, platelet and epoxy during assembly while the epoxy hardens, and subsequently provides mechanical support to the assembled unit.

Referring back to FIG. 1, the manner of operating the temperature measurement system will now be explained in order to illustrate the accuracy thereof. As indicated previously, the signal processor 52 is able to process four separate measurements, two from each of the detectors 48 and 50. The signal processor 52 calculates the ratio of $$\frac{I_1(R)I_2(S)}{I_1(S)I_2(R)} \quad (1)$$

where $I_1(R)$ represents the intensity of $\lambda_1$, as measured at the reference detector 48, $I_1(S)$ represents the intensity of $\lambda_1$ as measured at the sensing detector 50, $I_2(R)$ represents the intensity of $\lambda_2$ as measured at the reference detector 48, and $I_2(S)$ represents the intensity of $\lambda_2$ as measured at the sensing detector 50.

With the assumption that the attenuation of the fibers and the connectors and the coupling factors of the fiber couplers are the same for both wavelengths, these four quantities can be written as $$I_1(S) = I_1(1-Y_1)(1-Y_2)ab \quad (2)$$

$$I_1(R) = I_1(1-Y_1)Y_2 \quad (3)$$

$$I_2(S) = I_2Y_1(1-Y_2)a \quad (4)$$

$$I_2(R) = I_2Y_1Y_2 \quad (5)$$

In these equations, $I_1$ is the input intensity of the light $\lambda_1$ from LED 20. $I_2$ is the input intensity of the light $\lambda_2$ from LED 22. In the preferred embodiment $\lambda_1 = 880$ nm and $\lambda_2 = 950$ nm. Further in the equations, $Y_1$ is the coupling factor for the first fiber coupler 30. $Y_2$ is the coupling factor for the second fiber coupler 34. The attenuation of the fibers and connectors is represented by the factor "a", while the attenuation produced in the GaAs platelet 46 is represented by "b". Thus, the ratio as expressed above in equation (1) is $$\frac{I_1(R)I_2(S)}{I_1(S)I_2(P)} = 1/b. \quad (6)$$

As indicated in equation (6), this ratio of the four measurements is a function solely of the semiconductor platelet attenuation factor "b" (which is a function of temperature, but independent of the attenuation of the fibers and connectors and the light input intensities.

Figure 5:
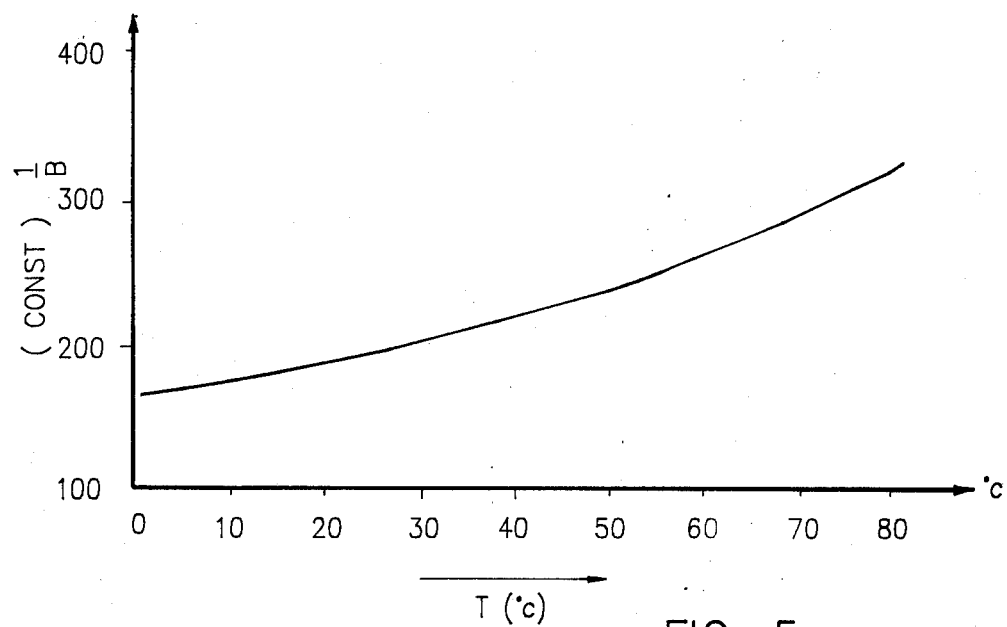
FIG. 5 is a graph depicting the absorption of light by the fiber-optic sensing head of FIG. 4 as a function of temperature.

FIG. 5 is a graph illustrating the relationship between temperature and the absorption coefficient 1/b.

An alternative embodiment of the fiber-optic sensing head is illustrated in FIG. 6, in which a single optical fiber 96 is used as both the input and output channel. A semiconductor platelet 98 is disposed at the distal tip of the fiber 96. A dielectric mirror 100 is placed on the back side of the semiconductor platelet 98, while an antireflection coating 102 is placed on the front side of the semiconductor platelet 98 (the assembly comprising single fiber detector 198). A dielectric mirror has the advantage that it can be used in environments where a metal mirror could not. That is, a metal mirro could alter the environmental conditions, such as in an area of high electrical or magnetic field. Further, use of the antireflection coating at the interface between the fiber and the semiconductor is useful to diminish any reflection losses.

Figure 7:
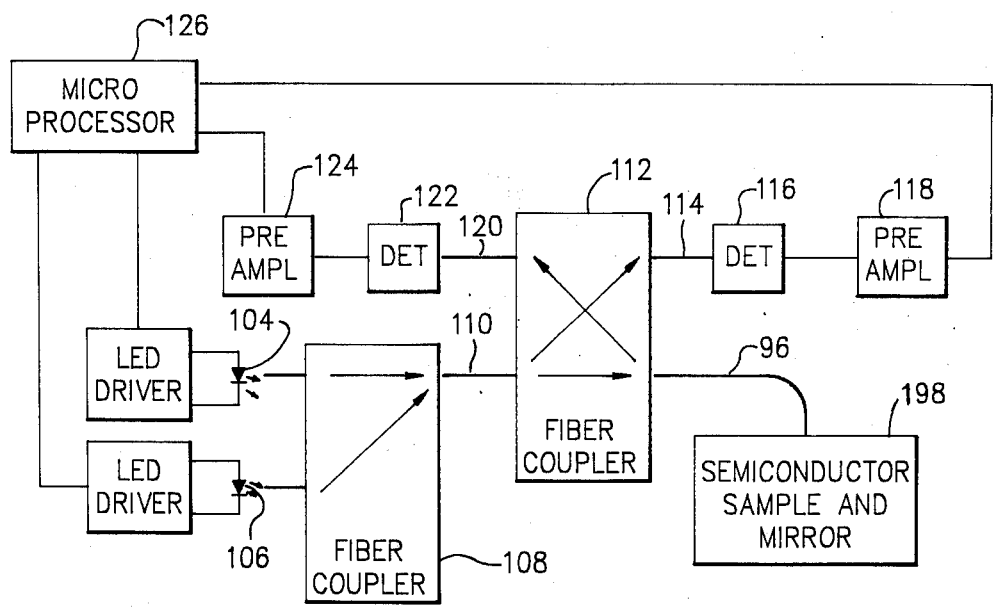
FIG. 7 depects a block diagram of a fiber-optic measuring system utilizing the single fiber-optical head of FIG. 6.

FIG. 7 illustrates the system configuration for using the single fiber sensing head of FIG. 6. In this embodiment, light from two LED sources 104 and 106 is coupled through a fiber coupler 108 into a single fiber channel 110. Another fiber coupler 112 guides light from the channel 110 to the input/output channel 96 of the single fiber detector 198. The fiber coupler 112 also directs light to channel 114, where it is detected by detector 116 and preamplifier 118. Light is reflected from the detector 198 back through the coupler 112 to channel 120, where it is detected by detector 122 and amplified by preamplifier 124. As thus described, the channels 110, 114, and detector 116 and preamplifier 118 comprise the reference channel as previously described in connection with FIG. 1. Similarly, the channels 110, 96, 120, and detector 122 and preamplifier 124 comprise the sensing channel as previously described in connection with FIG. 1. A microprocessor 126 processes the signals received from the preamplifiers 118 and 124, and controls the operation of the LEDs 104 and 106 as previously described.

Figure 8:
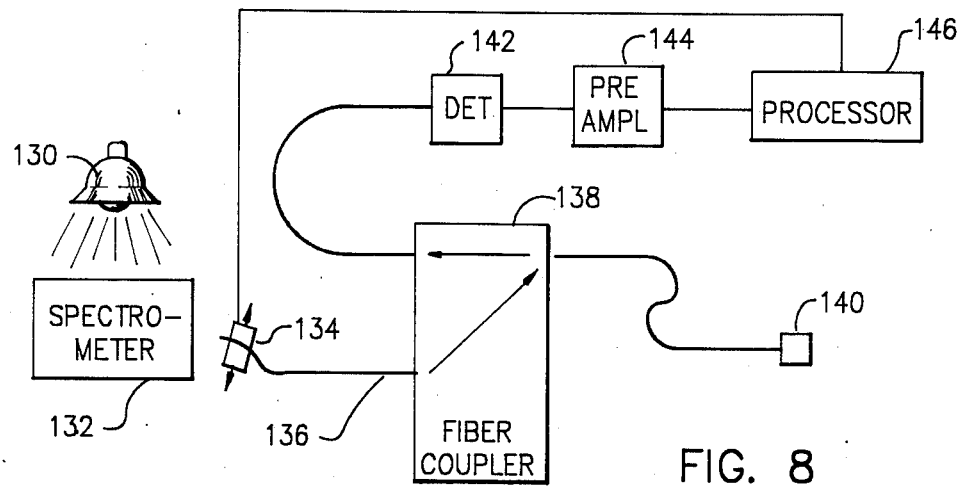
Figure 9:
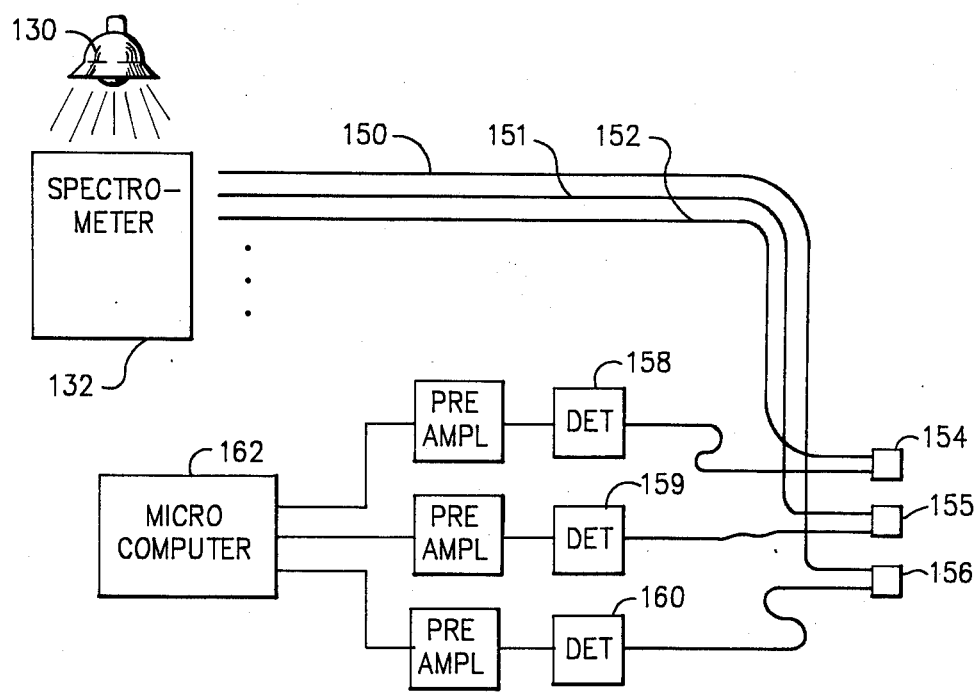

Further embodiments of the invention contemplate the use of a broad spectrum light source instead of LEDs. The advantage of using a broad spectrum light source is that the range of the temperature measurement is enlarged. Further, such light sources are typically not sensitive to changes in the environmental temperature as may be the case with LED's. FIGS. 8–10 illustrate various configurations that could be used with such a broad-band light source.

Referring to FIG. 8, a broad spectrum light source 130, such as a halogen lamp, is spectrally divided into a plurality of narrow band light sources by a prism or grating 132. At the output of the spectrometer, a fiber end face is positioned on a translation stage 134. This allows the spectrum to be scanned in order to select a desired narrow band light source that can be guided through optical fiber 136 to a fiber coupler 138 and to a semiconductor sample 140. The selected light is guided back through the fiber coupler 138 to a detector 142 where it is converted to an electrical signal. This electrical signal is amplified by preamplifier 144 and directed to signal processor 146. The processor 146, using known information concerning the location of the fiber on the translation stage 134, the magnitude of the signal from the detector 142, and the absorption spectrum of the semiconductor 140 (which is dependent on the temperature), can derive a temperature measurement.

FIG. 9 illustrates another configuration where a broad spectrum light source 130 is employed. In this configuration, the different wavelengths of the broad spectrum light source 130 are separated in space through the use of a prism or grating 132, as was done in connection with the configuration of FIG. 8. But, in FIG. 9, the different frequencies (or narrow band light sources) are then coupled into different fibers 150–152. The fiber bundle guides the light of various frequencies to semiconductor samples 154–156 and to detectors 158–160. A microcomputer 162, or other suitable processor, can then use the intensity measurements to derive the temperature of the semiconductor samples 154–156.

Referring next to FIG. 10, a still further configuration is illustrated using a broad-band light source 130. In the configuration of FIG. 10, light from the source 130 is coupled to a single fiber 164. This fiber is connected to a fiber coupler 165 which directs the light through the single fiber 166 to a semiconductor sample 168. The light is directed back through the fiber 166 to the fiber coupler 165, where it is directed through 170 to a spectrometer 172, which spectrometer separates the different wavelengths in space through the use of a prism or a grating. A diode array 174 translates the intensity distribution into an electrical signal which can be switched to a suitable processor 176 through the use of an appropriate multiplexer circuit 178.

Referring next to FIGS. 11–13, some alternative configurations of the fiber-optic sensing head of the present invention are illustrated. These alternative embodiments achieve the same function as the embodiment illustrated in FIG. 4. That is, they allow the input and output fiber channels to be parallel and still direct the light through a semiconductor platelet or other suitable sensitive material. Referring to FIG. 11, an input fiber channel 180 directs the incoming light through a semiconductor sample 182 positioned at the tip thereof. A prism 184, having a reflective coating 186 thereon, causes the light to be reflected off the walls of the prism back through an output fiber channel 188. In FIG. 12, a similar configuration is employed wherein two prisms 190 and 192 are employed, each having a suitable reflective coating 194 thereon. A semiconductor material 196 is placed between the fronting faces of the prisms 190 and 192.

In the embodiment of FIG. 13, a semiconductor material 200 is fashioned into a prism shape. The end faces of the fiber input channel 180 and the fiber output channel 188 are polished at an angle determined by the refractive index of the fibers and of the semiconductor 200. In this embodiment, the semiconductor material 200 should have a higher refractive index than the fibers 180 and 188. Light entering the input channel 180 is coupled at the semiconductor prism 200, reflected at the surface 201, and coupled into the output fiber channel 188. If the index of refraction of the semiconductor prism is high enough, the light is totally reflected at the surface and no reflective coating is needed.

As will be recognized by those skilled in the art, while the temperature measurement obtained using a system such as that shown in FIG. 1 with a fiber-optic sensing head such as is shown in FIG. 4 generates a temperature measurement that is independent of input light intensities, fiber attenuation, and fiber coupling factors, the temperature measurement may be influenced by changes of attenuation, input intensities, coupling factors, and electrical circuit performance that occurs between the measurement of the intensities of the two light sources. This source of error could be easily minimized by modulating the two LEDs with different frequencies so that the LEDs were on continuously. In such an instance, the output values would then have to be filtered through a suitable band pass filter to enable simultaneous operation of both LED's and a real time measurement of the four values referenced in Equation (6).

A different change or shift of the attenuation or coupling factor for the two wavelengths could also affect the temperature measurement. However, in the measurements made to date, these factors have been found to be of very little significance.

During operation of the system shown in FIG. 1, precautions were taken to stabilize the spectrum of the LED sources 20 and 22. This was necessary because the wavelengths $\lambda_1$ and $\lambda_2$ may change with junction temperature. Accordingly, the electrical power at the LED and the temperature of the heat sink utilized in connection therewith were stabilized in order to hold the junction temperature at a constant value. This was achieved in the measurements made to date by stabilizing the current through the LEDs. The heat sink temperature was held at a constant value by a thermo-electric cooler.

The LED 20 having the wavelength $\lambda_1$ near the GaAs band gap can be realized with an Opto diode GaAlAs LED with a wavelength of 880 nm and a spectrum band width of 80 nm. A Telefunken GaAs:Si LED with a wavelength of 950 nm may be used as the reference LED 22 having wavelength $\lambda_2$. The various fiber-channels may be realized from a silica core and hard polymer cladding fiber. Such fibers are readily available from numerous sources. The temperature range of this fiber is −55 degrees C. to +125 degrees C. These temperature limits must be considered when the temperature range of the system is determined.

It has been found that the attenuation of the different fiber sensors is typically between 8 and 11 dB. A part of this attenuation is due to the reflection at the epoxy GaAs surfaces. The response of a sensor built in accordance with the teachings presented herein was determined by calibration in a water bath in a range of 0 degrees C. to +95 degrees C. These results are illustrated in FIG. 5. The sensor stability was measured in an ice-water bath at 0 degrees C. The stability of the system was better than 0.1 degrees C., but there was a long term drift of 0.2 degrees C. per day. This long term drift was thought to be due to a change of the transmission spectrum of the fibers, the fiber connectors and sensor, changes in the coupling factor for the two wavelengths, or a change of the wavelength (junction temperature) of the emitted light of the LED's. The response time of the sensor as measured by moving the sensor from room temperature to a 90 degree C. water bath was found to be about 0.8 seconds.

The fiber-optic sensing system herein described has proven to be very versatile. Because of its inherent geometric versatility, the sensor head itself can be formed into arbitary shapes such as loops and spirals. Moreover, the sensor is very lightweight and its compact design allows it to be utilized for sensing temperature at locations that are unaccesible with other known sensors. Advantageously, the configuration totally eliminates the influence of intensity fluctuation of the light sources and that of the fiber absorption and the coupling factor of the fiber coupler. Because the sensor is immune from electromagnetic interference, and because the sensor exhibits better resistance to corrosion, and is inherently more simple than prior art sensors, it is believed that the sensor will have potential applications in a variety of emerging fields.

While the invention herein disclosed has been described by means of specific embodiments and applications thereof, numerous modifications and variations could be made thereto by those skilled in the art without departing from the spirit and scope of the invention. It is to be understood therefore, that within the scope of the appended claims the invention may be practiced otherwise than as specifically described herein.

What is claimed is:

1. A fiber-optic sensing system comprising:
    a light source emitting light of at least a first frequency and a second frequency;
    fiber-optic sensing head means, having channeling means comprising a single light path for both frequencies therethrough, for varying light of said first frequency channeled thereto as a function of an environmental parameter to which said fiber-optic sensing head means is subjected;
    detection means for detecting light of both said frequencies channeled thereto and for generating a detection signal indicative of sensed variations in the detected light
    sensing fiber-optic channel means for directing light of both frequencies from said light source to said fiber-optic sensing head means and for directing light from said fiber-optic sensing head means to said detection means;
    coupling means in said fiber-optic channel means between said light source and said fiber-optic sensing head means to merge the light paths of said first and second frequencies of light into a single light path for both frequencies through said fiber-optic sensing head means;
    reference fiber-optic channel means for directing light of both frequencies from said light source to said detection means without passing though said fiber-optic sensing head means; and
    signal processing means coupled to said detection means for processing the signals generated from light channeled through said sensing fiber-optic sensing means and for processing the detection signal generated from light channeled through said reference fiber-optic channel means, said processing being carried out in order to generate an indicating signal that accurately indicates the value of said environmental parameter as a function of said variation in the first frequency of light received from said fiber-optic sensing head means as compared to said second frequency of light received from said fiber-optic sensing head means and to both frequency portions of light received through said reference fiber-optic channel means.

2. The fiber-optic sensing system of claim 1 wherein said fiber-optic sensing head means comprises:
    a first element exhibiting optical properties that vary as a function of the environmental parameter to which said fiber-optic sensing head means is subjected;
    input channeling means for directing light to said first element, and
    output channeling means for directing light away from said first element after said light said first frequency of has been affected by the optical properties of said first element.

3. The fiber-optic sensing system of claim 2 wherein said input channeling means and said output channeling means of said fiber-optic sensing head comprise input and output optical fibers, respectively, both of which approach said first element from the same direction.

4. The fiber-optic sensing system of claim 3 wherein the first element of said fiber-optic sensing head means comprises:
    a semiconductor material having front and back sides that are substantially parallel,
    a mirror affixed to the back side of said semiconductor material said mirror having a reflective surface facing the back side of the semiconductor material.

5. The fiber-optic sensing system of claim 4 wherein the optical fibers that comprise the input and output channeling means of said fiber-optic sensing head means are attached to the front side of said semiconductor material at matching angles of incidence and reflectance, respectively, whereby light directed to said semiconductor through said input optical fiber passes through said semiconductor and reflects off of said mirror at an angle that directs it back through said semiconductor and out said output optical fiber.

6. The fiber-optic sensing system of claim 3 wherein the input and output optical fibers of said fiber-optic sensing head are substantially parallel, and wherein said first element is affixed between said input and output optical fibers at a distal tip thereof, and further including reflective means located at the distal tip of said input and output optical fibers for reflecting light from said input optical fiber through said first element to said output optical fiber.

7. The fiber-optic sensing system of claim 6 wherein said reflective means comprises:

means for bonding the input and output optical fibers at the distal tip of said fibers so that the parallel relationship between said fibers is maintained and said first element is held therebetween:
a first reflective surface at the distal tip of said input optical fiber that forms substantially a 45 degree angle with the axis of said input optical fiber, said reflective surface serving to reflect light traveling along the axis of said input optical fiber orthogonally away from said axis, said reflected light being directed through said first element; and
a second reflective surface at the distal tip of said output optical fiber that forms substantially a 45 degree angle with the axis of said output optical fiber, said reflective surface serving to receive the light that has been orthogonally reflected away from the axis of the input optical fiber, and that has passed through said first element, and reflect this light back along the axis of said output optical fiber.

8. The fiber-optic sensing system of claim 7 wherein the first element of said fiber-optic sensing head comprises a semiconductor material that absorbs some of the said first frequency of light passing therethrough, and wherein the amount of light absorbed is a function of temperature, whereby the temperature to which the semiconductor material is exposed can be determined by measuring the intensity of the light allowed to pass therethrough.

9. The fiber-optic sensing system of claim 1 wherein said coupling means also is disposed between said light source and said detection means and subsequent to said merger of the light paths of said first and second frequencies of light into a single light path for both frequencies said merged light path is divided into two segments with the first segment of said merged path being directed through said fiber-optic sensing head means and then to said detection means and the second segment of said merged light path being directed to said detection means without passing through said fiber-optic sensing head.

10. The fiber-optic sensing system of claim 9, wherein substantially equal portions of light at each frequency are coupled to said detection means via said sensing fiber-optic channel means and via said reference fiber-optic channel means.

11. The fiber-optic sensing system of claim 9 further including light source control means for selectively turning said light frequencies on and off such that only one light frequency is passing through said sensing fiber-optic channel means and said reference fiber-optic channel means at any given time.

12. The fiber-optic sensing system of claim 9 wherein at least four distinct light measurements are made at said detection means, said measurements including: (1) light at a first frequency that arrives at said detection means via said sensing fiber-optic channel means; (2) light of said first frequency that arrives at said detection means via said reference fiber-optic channel means; (3) light at a second frequency that arrives at said detection means via said sensing fiber-optic channel means; and (4) light of said second frequency that arrives at said detection means via said reference fiber-optic channel means.

13. The fiber-optic sensing system of claim 12 wherein said signal processing means processes the detection signals generated as a result of said four distinct measurements in order to derive said environmental indicating signal so that said environmental indicating signal is not affected by variations of the intensity of the light: (1) as generated at said light source, (2) as caused by transmission attenuation as the light passes through various optic fibers comprising part of said sensing fiber-optic channel means, and (3) as caused by the amount of light coupled to either of said fiber-optic channel by said fiber-optic coupler means.

14. The fiber-optic sensing system of claim 13 wherein said signal processing means determines the ratio of $$\frac{I_1(R)I_2(S)}{I_1(S)I_2(R)}$$

wherein, as received at said detection means, $I_1(R)$ is the intensity of the first frequency of light in said reference segment, $I_2(S)$ is the intensity of said second frequency of light in said sensor segment from said fiber-optic sensing head means, $I_1(S)$ is the intensity of said first frequency of light in said sensor segment from said fiber-optic sensing head means, and $I_2(R)$ is the intensity of the second frequency of light in said reference segment.

15. The fiber-optic sensing system of claim 14 wherein said fiber-optic sensing head means varies light of said first frequency as a function of the environmental parameter to which the fiber-optic sensing head is subjected, but does not vary light of said second frequency as a function of said environmental parameter.

16. An optical fiber coupler comprising:
fiber-optic sensing head means for affecting one frequency portion of light channeled thereto as a function of an environmental parameter to which said fiber-optic sensing head means is subjected;
input fiber-optic channeling means for directing light of a plurality of frequencies including said one frequency along a single light path from a light source remaining together through said fiber-optic sensing head means; and
output fiber-optic channeling means for directing said light of a plurality of frequencies including said one frequency away from said fiber-optic sensing head means.

17. The fiber-optic sensing system of claim 9 wherein said detection means comprises a separate detector placed in each of the divided light paths, the detector in said first path segment being disclosed in that portion of the path exiting from said fiber-optic sensing head.

18. The optical fiber coupler of claim 16 wherein said fiber-optic sensing head means comprises a first element that passes light therethrough not of the prescribed frequency range without substantial attenuation, but that passes light therethrough of the prescribed frequency range with an attenuation factor that varies as a function of said environmental parameter.

19. The optical fiber coupler of claim 18 wherein said first element comprises a semiconductor.

20. The optical fiber coupler of claim 19 wherein said semiconductor comprises gallium arsenide (GaAs).

21. The optical fiber coupler of claim 20 wherein said prescribed frequency range comprises frequencies in the range of 880 nanometers.

22. The optical fiber coupler of claim 16 wherein said fiber-optic sensing head means includes a first element exhibiting optical properties that vary as a function of the environmental parameter to which said fiber-optic sensing head means is subjected, and wherein said input fiber-optic channeling means and said output fiber-optic channeling means comprise input and output optical fibers, respectively, both of which approach said first element from the same direction.

23. The optical fiber coupler of claim 22 wherein the first element of said fiber-optic sensing head comprises;
a semiconductor material having front and back sides that are substantiately parallel,
a mirror affixed to the back side of said semiconductor material, said mirror having a reflective surface facing the back side of the semiconductor material.

24. The optical fiber coupler of claim 22 wherein the optical fibers that comprise the input and output channeling means of said fiber-optic sensing head are attached to the front side of said semiconductor material at matching angles of incidence and reflectance, respectively, whereby light directed to said semiconductor through said input optical fiber passes through said semiconductor and reflects off of said mirror at an angle that directs it back through said semiconductor and out said output optical fiber.

25. The optical fiber coupler of claim 22 wherein the input and output optical fibers of said fiber-optic sensing head are substantially parallel, and wherein said first element is affixed between said input and output optical fibers at a distal tip thereof, and further including reflective means located at the distal tip of said input and output optical fibers for reflecting light from said input optical fiber through said first element to said output optical fiber.

26. The optical fiber coupler of claim 25 wherein said reflective means comprises:
means for bonding the input and output optical fibers at the distal tip of said fibers so that the parallel relationship between said fibers is maintained and said first element is held therebetween;
a first reflective surface at the distal tip of said input optical fiber that forms substantially a 45 degree angle with the axis of said input optical fiber, said reflective surface serving to reflect light traveling along the axis of said input optical fiber orthogonally away from said axis, said reflected light being directed through said first element; and
a second reflective surface at the distal tip of said output optical fiber that forms substantially a 45 degree angle with the axis of said output optical fiber, said reflective surface serving to receive the light that has been orthogonally reflected away from the axis of the input optical fiber, and that has passed through said first element, and reflect this light along the axis of said output optical fiber.

27. The optical fiber coupler of claim 26 wherein the first element of said fiber-optic sensing head comprises a semiconductor material that absorbs some of the light passing therethrough, and wherein the amount of light absorbed of said one frequency is a function of temperature, whereby the temperature to which the semiconductor material is exposed can be determined by measuring the intensity of the light allowed to pass therethrough.

28. In an environmental parameter measurement system that includes: (1) first and second light sources for generating light at first and second frequencies, respectively; (2) an optical sensing head for varying light of the first frequency channeled therethrough as a function of an environmental parameter to which said optical sensing head is subjected, and wherein light of the second frequency channeled through said optical sensing head is not so affected: and (3) optical detection means for detecting a desired parameter, such as intensity, of light directed thereto; a method for accurately measuring said environmental parameter comprising the steps of:
(a) placing said optical sensing head in an environment where the optical sensing head is subjected to the environmental parameter that is to be measured;
(b) channeling light of both said first and second frequencies through a single path said optical sensing head to said optical detection means;
(c) measuring at said optical detection means, the desired parameter of the light of said first frequency channeled through said optical sensing head;
(d) measuring, at said optical detection means, the desired parameter of the light of said second frequency channeled through said optical sensing head;
(e) channeling light of both said first and second frequencies through a reference channel, without passing said light through said optical sensing head, to said optical detection means;
(f) measuring, at said optical detection means, the desired parameter of the light of said first frequency channeled through said reference channel;
(g) measuring, at said optical detection means, the desired parameter of the light of said second frequency channeled through said reference channel; and
(h) generating an environmental parameter measurement signal that comprises the product of the measurements of steps (d) and (f) divided by the product of the measurements of steps (c) and (g).

29. The method of claim 28 wherein the channeling of light of said first and second frequencies through said optical sensing head and said reference channel occurs during separate time intervals, whereby the measurements of steps (c), (d), (f), and (g) are performed at separate time intervals.

30. The method of claim 28 wherein the desired parameter of the light measured in steps (c), (d), (f), and (g) is the intensity of the light.

31. An optical sensing system comprising:
a light source emitting light of at least a first frequency and a second frequency;
sensing head means having channeling means comprising a single light path for both frequencies therethrough for varying light of said first frequency channeled thereto as a function of an environmental parameter to which said sensing head means is subjected;
detection means for detecting light of both said frequencies channeled thereto and for generating a detection signal indicative of sensed variations in the detected light;
first light direction means for directing light of both frequencies from said light source to said sensing head means and for directing light from said sensing head means to said detection means;
coupling means between said light source and said sensing head means to merge the light paths of said first and second frequencies of light into a single light path for both frequencies through said sensing head means;
second light direction means for directing light of both frequencies from said light source to said detection means without passing through said sensing head means; and processing means for processing the signals generated from by said detection means and for generating an indicating signal therefrom that accurately indicates the value of said environmental parameter to which said sensing head means is subjected.

32. The optical sensing system of claim 31 wherein said sensing head means comprises:
- a material having optical properties that vary as a function of the environmental parameters to which said sensing head means is subjected; and
- means for directing light to and from said material from the same side thereof.

33. The optical sensing system of claim 31 wherein said detection means comprises a first detector for detecting light of said first frequency and a second detector for detecting light of said second frequency.

34. An optical sensing system comprising:
- a broad band light source for generating light having a spectrum of frequencies therein including at least a prescribed first frequency and a second frequency;
- sensing head means, having channeling means comprising a single light path for both frequencies therethrough, for varying light of said first frequency directed thereto as a function of an environmental parameter to which said sensing head means is subjected;
- detection means for detecting light of both said frequencies directed thereto and for generating a detection signal indicative of sensed variations in the detected light;
- light direction means for directing light of said plurality of frequencies from said light source to said sensing head means and for directing light from said sensing head means to said detection means;
- coupling means between said light source and said sensing head means to merge the light paths of said plurality of frequencies of light into a single light path through said sensing head means; and
- processing means for processing signals generated from by said detection means and for generating an indicating signal therefrom that accurately indicates the value of said environmental parameter to which said sensing head means is subjected.

35. The optical sensing system of claim 34 further including:
- light spectrum dividing means interposed between said broad band light source and said light direction means for separating the light from said broad band light source into a plurality of narrow band light sources of separate frequencies; and
- means for selectively directing said narrow band light source of a prescribed frequency to said light direction means;
- whereby a desired light frequency can be directed to said sensing head means.

36. The optical sensing system of claim 34 further including:
- light spectrum dividing means interposed between said sensing head means and said detection means for separating the broad band light from said light source into a plurality of narrow band light sources of separate frequencies including said prescribed frequency; and
- means for processing the detection signal resulting from a selected narrow band light source applied to said detection means.

37. The optical sensing system of claim 36 wherein said means for processing a detection signal resulting from a selected narrow band light source includes;
- a detection array comprising a plurality of detectors, each of which generates a separate detection signal responsive to frequencies contained within a narrow band light source; and
- multiplexing means for selectively connecting one of said separate detection signals to said processing means.

38. The optical sensing system of claim 34 wherein:
said sensing head means comprises a plurality of sensing heads;
said light direction means comprises a plurality of light channels coupled to respective sensing heads and detectors; and further including;
light spectrum dividing means interposed between said broad band light source and said light direction means for separating the light from said broad band light source into a plurality of narrow band light sources, each narrow band light source being directed through one of said light channels to its respective sensing head and detector.

* * * * *

UNITED STATES PATENT AND TRADEMARK OFFICE
CERTIFICATE OF CORRECTION

PATENT NO. : 4,703,175
DATED : October 27, 1987
INVENTOR(S) : MICHAEL M. SALOUR ET AL.

It is certified that error appears in the above-identified patent and that said Letters Patent is hereby corrected as shown below:

At Column 1, line 5, the following should be inserted:

--STATEMENT OF GOVERNMENT INTEREST

The invention described herein may be manufactured and used by or for the Government for governmental purposes without the payment of any royalty thereon.--.

Signed and Sealed this

Twentieth Day of March, 1990

Attest:

JEFFREY M. SAMUELS

Attesting Officer

Acting Commissioner of Patents and Trademarks